May 28, 1929.         J. E. BODA         1,715,186

TANDEM DISK HARROW

Filed June 11, 1923         3 Sheets-Sheet 1

May 28, 1929.　　　J. E. BODA　　　1,715,186
TANDEM DISK HARROW
Filed June 11, 1923　　　3 Sheets-Sheet 2

Inventor:
Joseph E. Boda
by L. C. Shonts Atty.

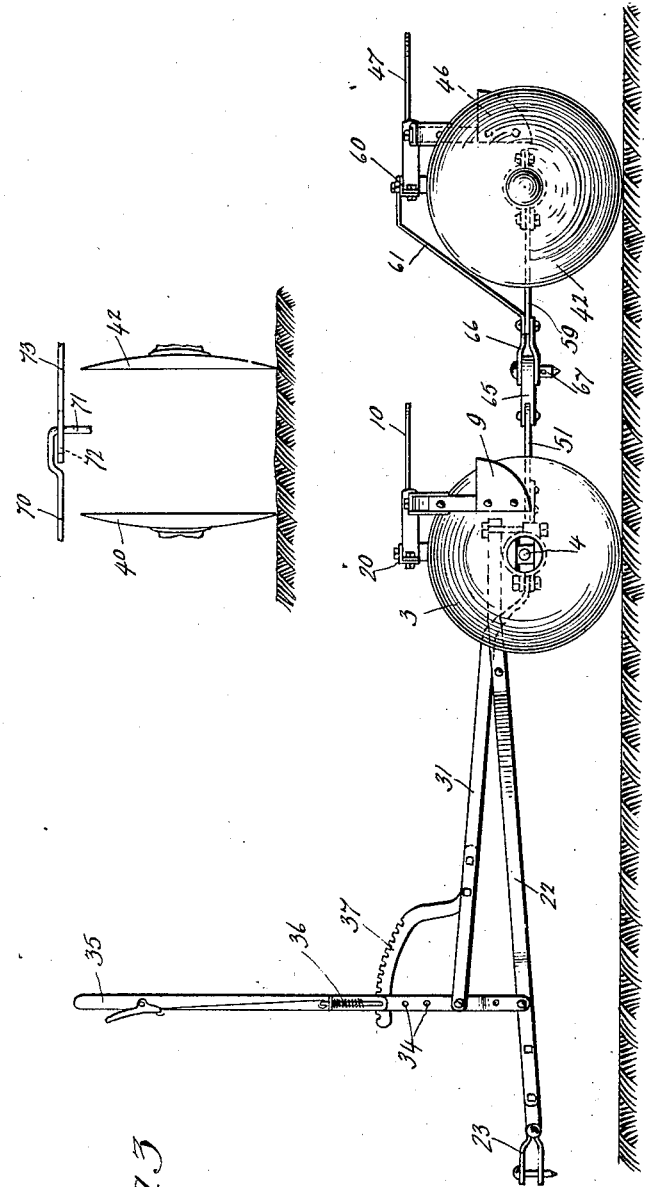

Patented May 28, 1929.

1,715,186

UNITED STATES PATENT OFFICE.

JOSEPH E. BODA, OF MOLINE, ILLINOIS, ASSIGNOR, BY MESNE ASSIGNMENTS, TO MOLINE IMPLEMENT COMPANY, A CORPORATION OF ILLINOIS.

TANDEM-DISK HARROW.

Application filed June 11, 1923. Serial No. 644,580.

The invention relates to a tandem disk harrow.

The general object of the invention is to provide an improved and simplified tandem disk harrow.

More specifically the object is to provide a tandem disk harrow in which reach rods and levers for angling the rear gangs are eliminated, such angling being obtained by more simple connections than have heretofore been used.

Other objects and advantages of the invention will appear from the specification and drawings.

An embodiment of the invention is shown in the drawings in which—

Figure 1 is a plan view of the harrow in transport position.

Figure 3 is a side elevation of the harrow in transport position.

Figure 4 is a detail of the connection between the rear disk gangs.

Figure 2:
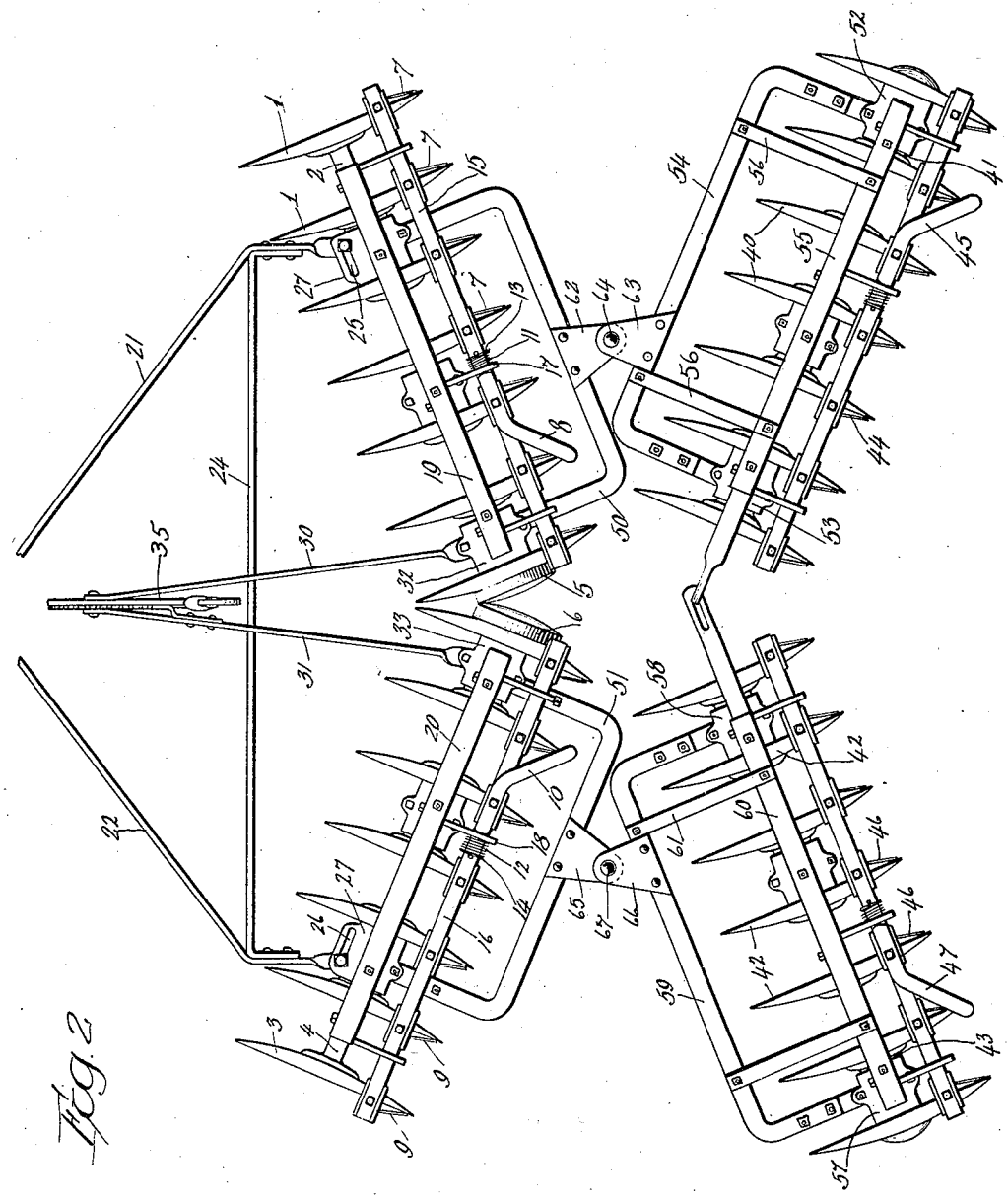
Figure 2 is a plan view of the harrow in angled or working position.

The disk harrow includes a right hand front gang comprising a plurality of disks 1 mounted on a common shaft 2 and a left hand front gang comprising a plurality of disks 3 mounted on a common axle 4. The disks of the front pair of gangs are mounted so as to throw soil outwardly and the reaction on the gangs tends to move them toward one another. Their inner ends are provided with bumpers 5 and 6 respectively, for absorbing the inthrust should the two inner ends of the gangs bump together.

The right hand gang is provided with a plurality of scrapers 7 thrown into and out of engagement by a lever 8 and the left hand gang is provided with a plurality of scrapers 9 thrown into and out of engagement by a lever 10. The sets of scrapers are normally held out of engagement with the disks by means of springs 11 and 12 repectively, bearing at one end against the stops 13 and 14 on the bars 15 and 16 on which the scrapers are mounted, and bearing at their other ends against stops 17 and 18 fixed to the top bars 19 and 20 which are, in turn, connected to the axles 2 and 4. The levers 8 and 10 are mounted on the bars 15 and 16. When the levers are moved to engage the stops 17 and 18 they serve to move the bars 15 and 16 longitudinally, the length of the levers being such that when they reach a dead center position the bars will have been moved to a position to hold the scrapers in engagement with the disks.

Draft is transmitted to the front pair of gangs by a pair of draft bars 21 and 22 which converge forwardly where they are connected together and to a clevis 23. The rear ends of the bars are braced by a U-shaped cross member 24 and the bars are adjustably connected in the slots 25 and 26 in bearings 27 and 28 on the axles 2 and 4 of the front disk gangs.

The front pair of gangs are angled by means of the angling bars 30 and 31 connected to bearings 32 and 33 on the inner ends of shafts 2 and 3. The angling bars are adjustably connected in any one of a series of holes 34 in a lever 35 pivoted to the draft bars 21 and 22. The lever is provided with a latch 36 operating over a sector 37 fixed to the angling bar 31. When the lever 35 is in vertical position, as illustrated in Figures 1 and 3, the gangs occupy a transport position. When the lever is pushed backwardly to the position illustrated in Figure 2, the inner ends of the front pair of gangs are pushed rearwardly to angle them to the working position illustrated in Figure 2. During this movement, the gangs swing about the connection of the bearings 27 and 28 to the draft bars 21 and 22.

The rear pair of gangs are similar to the front pair, that is, the right hand gang comprises a plurality of disks 40 mounted on an axle 41, and the left hand gangs comprise a plurality of disks 42 mounted on an axle 43. A series of scrapers 44 controlled by lever 45 are provided for the right gang and a similar series of scrapers 46, controlled by lever 47, are provided for the left gang. These scrapers operate in the same manner as the scrapers described for the front pair of gangs. The disks of the rear pair of gangs are mounted so as to throw the dirt inwardly and the reaction therefore tends to move the disk gangs outwardly.

The object in having a rear pair of gangs trailing a front pair is to have the rear pair cut the soil left uncut by the front pair, and the rear pair is, therefore, connected in such position that the disks of the rear pair trail in the middle of the space between the disks and the front pair. This will be clear by referring to Figure 1.

One of the difficulties with harrows of this type is to hold the rear pair of gangs in proper trailing relation to the front pair. Various constructions have been provided for accomplishing this result, but all of them are more or less complicated and involve reach bars of one kind and another extending from the draft mechanism or from the front pair of gangs to the rear pair of gangs. Another difficulty is that of angling the rear pair of gangs with the front pair.

In the present invention, the draft is transmitted and the gangs are angled through a simple connection which eliminates a large number of parts heretofore used.

Connected to the bearings 27 and 32 of the right hand front gang is a U-bar 50, and connected to the bearings 28 and 33 of the left hand front gang is a similar U-bar 51. Connected to the outer bearing 52 and to the inner bearing 53 of the right rear gang is a U-bar 54 braced to the top bar 55 by a brace 56. Connected to the outer bearing 57 and to the inner bearing 58 of the left rear gang is a U-bar 59 braced to the top bar 60 by a brace 61. The right hand U-bars 50 and 54 have plates 62 and 63 riveted to them, which plates are pivoted together at the point 64. The U-bars of the left hand gangs have plates 65 and 66 connected to them and are pivoted together at the point 67.

These connections between the front and rear gangs perform several functions and have advantages as follows:—

The connections transmit the draft from the front pair of gangs to the rear pair. The draft for the right rear gang is transmitted through its connection to the right front gang. The draft for the left rear gang is transmitted through its connection to the left front gang.

This independent connection between the right gangs and between the left gangs serves to cause the front and rear right gangs and the front and rear left gangs to counterbalance one another. For example, the rear right gang tends to move to the right and the front right gang tends to move to the left, but the connection between the two causes the one to neutralize the other. The result is that the inner ends of the two front gangs do not contact one another with any great force and the harrow is counterbalanced.

The pivotal connections between the front and the rear gangs are located so that the rear gangs are angled whenever the front gangs are angled.

Assume, for example, that the harrow is traveling forward with the gangs in transport position, as illustrated in Figure 1. If the angling lever 35 is moved backwardly, the inner ends of the front pair of gangs will be pushed backward to the position illustrated in Figure 2. On account of the forward travel of the harrow, there will be no real backward movement of the disks but instead, the movement will amount to the inner ends of the front gangs remaining stationary while the outer ends are pulled forward by the draft mechanism. Of course, if the harrow is stationary, the inner ends of the gangs would be pushed back while the outer ends remain substantially stationary.

When the front gangs move from the position of Figure 1 to that of Figure 2, the pivots 64 and 67 swing outwardly and to the rear. Referring to Figure 1, it will be understood that, if the pivots 64 and 67 were moved outwardly, the rear pair of gangs would have to be moved longitudinally, but the resistance of the ground to such movement is so great that instead of moving outwardly to any noticeable extent, the gangs follow the path of least resistance and the outer ends of the rear pair of gangs swing backward to accommodate the outward movement of the pivots 64 and 67. The pivots move outward in an arc which throws the outer ends of the gangs to the rear, this movement being assisted by the forward travel of the harrow and by the fact that the pivots are located so that more of the disks are toward the outer ends of the gangs than toward the inner. The drag of the disks tends to pull the outer ends of the rear gangs rearwardly after the movement has been started. The location of pivots 64 and 67 is such that the rear gangs remain in the angling position illustrated in Figure 2.

Let it now be assumed that while the harrow is traveling forward, the front pair of gangs are angled from the position of Figure 2 to that of Figure 1. The angling lever 35 is pulled forward which pulls the inner ends of the front pair of gangs forward to the position of Figure 1. This movement swings the pivots 64 and 67 inwardly and forwardly. If these pivots were moved inwardly to carry the rear pair of gangs with them, the rear pair of gangs would have to be slid longitudinally along the ground. The resistance to such movement is very great, not only because of the individual resistance of every disk but because of the dirt that usually is piled up between the inner ends of the rear pair of gangs. The rear pair of gangs follows the line of least resistance and the outer ends roll forward to accommodate the inward movement of the pivots 64 and 67. As soon as they have moved forward to the position illustrated in Figure 1, they remain in that position, due to the fact that there is a pressure on the curved sides of the disks of the rear gangs, tending to move the gangs inwardly, the resultant effect being for the outer ends to tend to angle forward slightly. This pressure results from the curved disks entering the ground and is forward of the axis of the disk, that is, at the point where the disks enter the ground. This force, together with the weight of the gangs and the location of the pivot, serves to keep the rear disk gangs in transport position.

There is a tendency, under some conditions of operation, for the inner ends of the rear pair of gangs to jerk back and forth relative to one another. In order to overcome this tendency, the right hand rear gang is provided with a projecting arm 70 having a downwardly extending bent end 71 which passes through a slot 72 in the arm 73 on the left rear gang. This connection prevents the rear disk gangs from jerking back and forth relative to one another.

This connection between the inner ends of the rear pair of gangs serves an additional purpose in that it assists in the angling operation. For example, referring to Figure 2, when the pivots 64 and 67 are swung inwardly, if the resistance of the ground should not be sufficient to prevent longitudinal movement of the rear gangs, the connection of these gangs prevents them from approaching each other and inward movement of the pivots 64 and 67 must result in angling the rear gangs. The same holds true when the gangs are angled from the position of Figure 1 to that of Figure 2. The connection between the inner ends of the rear gangs prevents them from separating and insures an angling movement. This connection also assists in keeping the rear pair of gangs in transport position because if one rear gang tends to angle toward working position it must drag the other with it and the resistance of the two tends to keep both in transport position. It will be understood, however, that this connection is not necessary in order to secure an angling operation, although it serves as an aid in insuring that the proper action takes place.

The simplicity of the tandem disk harrow thus provided is pronounced. There are no reach bars and angling devices extending over the front gangs to the rear gangs. The harrow presents a neat appearance and its manufacture is simplified and rendered less expensive by the elimination of parts.

It will be understood that the structure shown is for purposes of illustration and that variations may be made in it without departing from the spirit and scope of the invention as defined by the claims.

I claim:

1. A tandem disk harrow having right and left front gangs, right and left rear gangs, draft connections for the front gangs, means for angling the front gangs, and draft connections for the rear gangs acting also to angle said gangs to and from working position when the front gangs are so angled, said draft connections for the rear gangs comprising a rigid support extending forwardly from each of the rear gangs, a rigid support extending rearwardly from each of the front gangs, a single pivotal connection between the supports of the left gangs and a single pivotal connection between the supports of the right gangs, said pivotal connections being located toward the inner ends of the gangs and in a position such that when the front gangs are angled to and from working position the rear gangs will be angled with them but in the opposite direction.

2. A tandem disk harrow having right and left front gangs, right and left rear gangs, draft connections for the front gangs, means for angling the front gangs and draft connections for the rear gangs acting also to angle said gangs to and from working position when the front gangs are so angled, said draft connections for the rear gangs comprising a U-shaped bar extending rearwardly from each of the front gangs, a U-shaped bar extending forwardly from each of the rear gangs, a single pivotal connection between the U-shaped bars of the left gangs, and a single pivotal connection between the U-shaped bars of the right gangs, said pivotal connections being toward the inner ends of the gangs and in a position such that when the front gangs are angled to and from working position the rear gangs are angled with them but in the opposite direction.

3. A tandem disk harrow having right and left front gangs, right and left rear gangs, draft connections for the front gangs, means for angling the front gangs, a rigid support extending rearwardly from each of the front gangs, a rigid support extending forwardly from each of the front gangs, a single pivotal connection between the supports of the left gangs, a single pivotal connection between the supports of the right gangs, said pivotal connections being located toward the inner ends of the gangs in a position to transmit draft from the front to the rear gangs and to angle the rear gangs when the front gangs are angled but in the opposite direction, and connections between the inner ends of the rear gangs for limiting their movement to and from one another and backward and forward relative to one another.

4. A tandem disk harrow having right and left front gangs, right and left rear gangs, draft connections for the front gangs, means for angling the front gangs, a rigid support extending forwardly from each of the rear gangs, a rigid support extending rearwardly from each of the front gangs, a single pivotal connection between the supports of the left gangs, a single pivotal connection between the supports of the right gangs, said pivotal connections being located toward the inner ends of the gangs to transmit draft from the front to the rear gangs and to angle the rear gangs when the front gangs are angled, and means between the inner ends of the rear gangs forming a fulcrum about which the rear gangs may turn in being angled.

In testimony whereof, I affix my signature.

JOSEPH E. BODA.

CERTIFICATE OF CORRECTION.

Patent No. 1,715,186.             Granted May 28, 1929, to

JOSEPH E. BODA.

It is hereby certified that error appears in the printed specification of the above numbered patent requiring correction as follows: Page 4, after line 12, insert the following as claim 5:

"5. A tandem disc having right and left front gangs, draft connections for the front gangs, means for angling the front gangs, right and left rear gangs, a rigid support extending rearwardly from each of the front gangs, a rigid support extending forwardly from each of the rear gangs, a pivotal connection between the supports of the front and rear left gangs, a pivotal connection between the supports of the front and rear right gangs, said pivotal connections being located nearer the inner ends of the gangs than the outer ends and in a position to transmit the draft from the front gangs to the rear gangs and to angle the rear gangs when the front gangs are angled when the harrow is in motion, and extensions rigid with and projecting inwardly from the inner ends of the respective rear gangs.";

and that the said Letters Patent should be read with this correction therein that the same may conform to the record of the case in the Patent Office.

Signed and sealed this 18th day of June, A. D. 1929.

(Seal)                                            M. J. Moore,
                                                   Acting Commissioner of Patents.

CERTIFICATE OF CORRECTION.

Patent No. 1,715,186. Granted May 28, 1929, to

JOSEPH E. BODA.

It is hereby certified that Certificate of Correction issued June 18, 1929, was erroneously drawn as to the last line of claim 5 and that this Certificate should have read as follows: After the word "gangs" and before the period in the last line of claim 5, insert the comma and words ", said extensions being pivoted together and having a limited sliding movement relative to one another"; that the said Certificate may conform to the records of the office.

Signed and sealed this 13th day of August, A. D. 1929.

(Seal)

M. J. Moore,
Acting Commissioner of Patents.